June 27, 1933.   W. O. FREYMANN   1,916,044
TIRE DISPLAY STAND
Filed Aug. 13, 1930

INVENTOR
WALTER O. FREYMANN
BY
Mason, Fenwick & Lawrence
ATTORNEYS

Patented June 27, 1933

1,916,044

UNITED STATES PATENT OFFICE

WALTER O. FREYMANN, OF OZONE PARK, NEW YORK, ASSIGNOR TO THE UNITED STATES PRINTING AND LITHOGRAPH COMPANY, OF BROOKLYN, NEW YORK, A CORPORATION OF OHIO

TIRE DISPLAY STAND

Application filed August 13, 1930. Serial No. 475,040.

This invention relates to improvements in display racks or stands, and has more particular relation to improvements in display racks or stands intended for displaying the actual automobile tires or casings that are to be sold.

The object of the invention is to provide a display stand or rack which will display the actual tire and hold it in approximately vertical position without in any way concealing its front face.

A further object of the invention is to provide a tire rack or stand made up of cardboard or paper, and which will display the tire in an approximately vertical position without in any way projecting in front of the tire to interfere with the view of the same.

The invention consists of a stand or rack made entirely of paper board and so constructed that it will rest upon the floor and project into the actual tire between the beads and thus support the tire within the center of gravity of the stand, and leave it with an unobstructed front face exposed to view.

The invention also consists of other novel constructions which will be hereinafter more particularly described and claimed.

Figure 1:
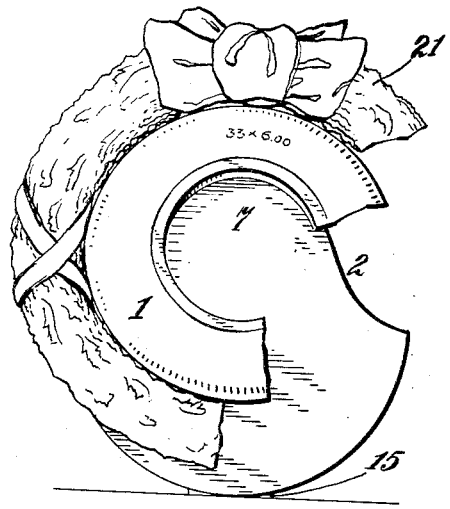
Figure 1 represents a front elevation partly broken away of the device embodying my invention.

Described in general terms, the present invention provides a tire display stand or rack for holding tires in display windows or other locations so that the actual tire is held in approximately vertical position with an unobstructed view of its front face, and a structure which is collapsible for shipping and which may be folded into a firm and rigid display rack constructed for supporting the tire clear of the floor in such manner that the excessive weight of the tire (at times over fifty pounds) is supported at one point within the tire, and this point or support being so located as to bring the center of gravity of the weight of the tire well within the base of the spreading wings or supports of the stand.

In the accompanying drawing, 1 represents the tire, 2 the main body of the stand or holder, 3, 4, the supporting wings, 5 the securing flap for the wings, and 6 the tire support which projects into the tire through the beads and supports the tire by contacting with the underside of the top wall of the tire.

The body portion 2 is formed with a stamped circular portion 7, which, when the tire is in position on the stand, projects into the circular area enclosed by the tire and receives any desirable lettering or other advertising matter.

The lower portion of the main body 2 curves outward as at 8 and 9 upon opposite sides, so as to extend to the back of the tire and form a rest for the lower portion of the tire.

The wing portions 3 and 4 are formed with inclined rear edges 11 and 12 and curved edges 13 and 14, these latter merging into the supporting strip 6. The lower parts of the wings are connected by a connecting strip 15. The wings are held in their extended position at right angles to the parts 6 and 15 by the flexible flap 5 which is notched as at 16 and 17 so that when the flap is turned at right angles to the parts 6 and 15, it will pass through the curved openings 18 formed in the wings 3 and 4, until the notches 16 and 17 are engaged by the walls of the notches 18 at the rear. This will hold the wings 3 and 4 extending at right angles to the parts 6 and 15, and will prevent any side movement of the wings. The rear edges 11 and 12 are formed with vertical braces 19 that are scored and bent laterally to stiffen these rear edges and prevent lateral collapse.

By reference to the drawing it will be seen that when the wings 3 and 4 join the support 6 within the tire, that this support with the remaining contours of the wings provides a stiffened support which is braced against any lateral bending by the parts of the wings 3 and 4 that extend at right angles to the part 6 and extend fully to the top of the part 6.

This structure prevents any tendency on the part of the tire to either fall to the rear or forward by the bending or buckling of the part 6. The lower edges 20 of the wings 3 and 4 are inclined in such a manner that the wings project upward to bring the supporting point of the section 6 well within the supporting base line of the wings which are resting upon the floor.

In this manner, the excessive weight of the tire which falls upon the top of the part 6 is brought well within the center of gravity and the bracing effect of the edges 20 so that there will be no tendency of the support or stand to tip either one way or the other, and the weight of the tire cannot pull the stand over forward.

It will be understood that the rear portion of this display stand, constituting the parts 5, 6, and 15 and the wings 3 and 4, are all stamped out of a single sheet of paper board, and that this paper board is secured in any suitable manner to the back of the main portion 2 of the stand.

It will be seen from the above that even the heaviest tires may be slipped upon the supporting portion 2 by passing the same through the inside of the tire from the rear and up between the beads of the tire with the front of the tire resting against the wings 8 and 9 clear of the floor, the entire weight of the tire being supported from the center of the tire by the part 6, and well within the center of gravity of the base of the supporting wings.

It will also be seen that the tire is so supported that the entire front face of the tire is exposed to view without any obstruction, and from the front of the tire it is not apparent how the same is being supported in position free of the floor. As an added advertising adjunct to the stand, a holly wreath with a bow, also provided of paper board, 21, is passed over the tire to give it the effect of being entirely enclosed in the wreath.

Figure 2:
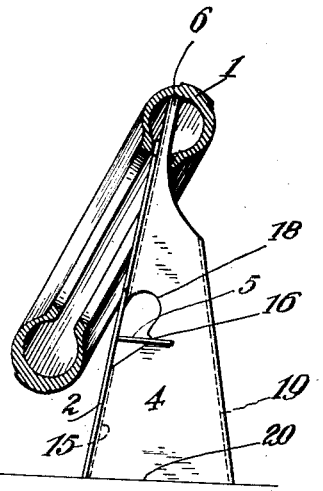
Figure 2 represents a central vertical section through the same.
Figure 3:
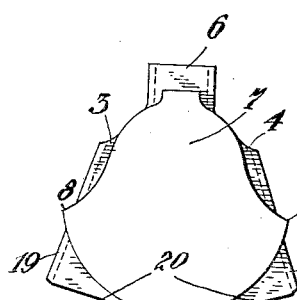
Figure 3 represents a front elevation of the two blanks forming the stand secured together.
Figure 4:
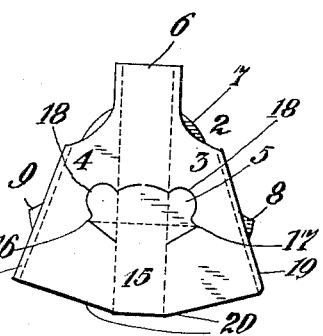
Figure 4 represents a rear elevation of these two blanks before the wings are bent into supporting position.
Figure 5:
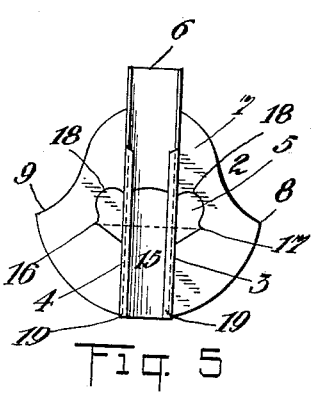
Figure 5 represents a similar rear elevation with the two supporting wings bent into supporting position.
Figure 6:
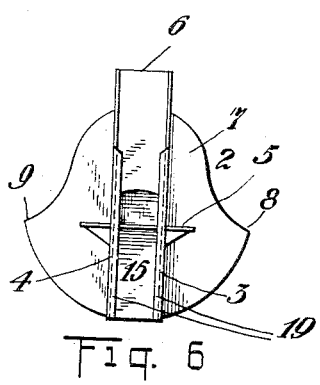
Figure 6 represents the same view as Figure 5 with the flap pushed down to lock the wings.
Figure 7:
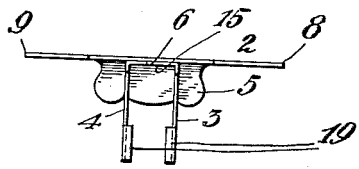
Figure 7 represents a top plan view of Figure 6.

It will be seen from the foregoing description that this display rack and stand, while it is made of paper board and is comparatively light, and made to be collapsible and easily shipped or mailed to its destination, provides a very rigid support for very heavy tires, and may be instantly set up in its supporting position with very little trouble by simply bending the two wings to the rear at the scored lines and then bending the flap down in position to hold the wings extended and spaced. By reference to Figures 2 and 3 it will be seen that the upper part of the face plate 7 is tapered towards its junction with the supporting strip 6 so that when the portion 6 is slipped within the tire from the rear, the tire will tend to swing back until the beads of the tire contact with the curved edges of the upper part of the face plate 7. This action, as clearly shown in Figure 2, wedges the tire on the plate 7 so that it is not only supported from swinging back and forth, but is also held from any displacement from side to side. The tires automatically adjust themselves to this wedged condition even though the inner openings of such tires are of different diameters. By this structure my improved support will support any sized tire without being constructed specifically for that particular size as the different sizes automatically adjust themselves to a firm supporting position by tending to swing to the rear from the central support at 6.

Having thus described my invention, what I claim as new and patentable is:

1. In a tire stand or support for different sized tires, the combination with a body portion for supporting the inner wall of the tread of a tire vertically from within the tire, of means for holding the tire against lateral movement connected to said body portion and having downwardly and outwardly extending edges and so tapered that the walls of the tire opening adjust themselves automatically to form contact therewith.

2. In a tire stand or support for different sized tires, the combination with a body portion for supporting the inner wall of the tread of a tire vertically from within the tire, of means connected to the body portion for preventing lateral movement of a tire and comprising a member having downwardly and outwardly extending edges so located that the tire contacts therewith by gravity.

In testimony whereof I affix my signature.

WALTER O. FREYMANN.